H. T. SHRIVER.
FILTER PRESS.
APPLICATION FILED SEPT. 22, 1919.
1,342,829.
Patented June 8, 1920.
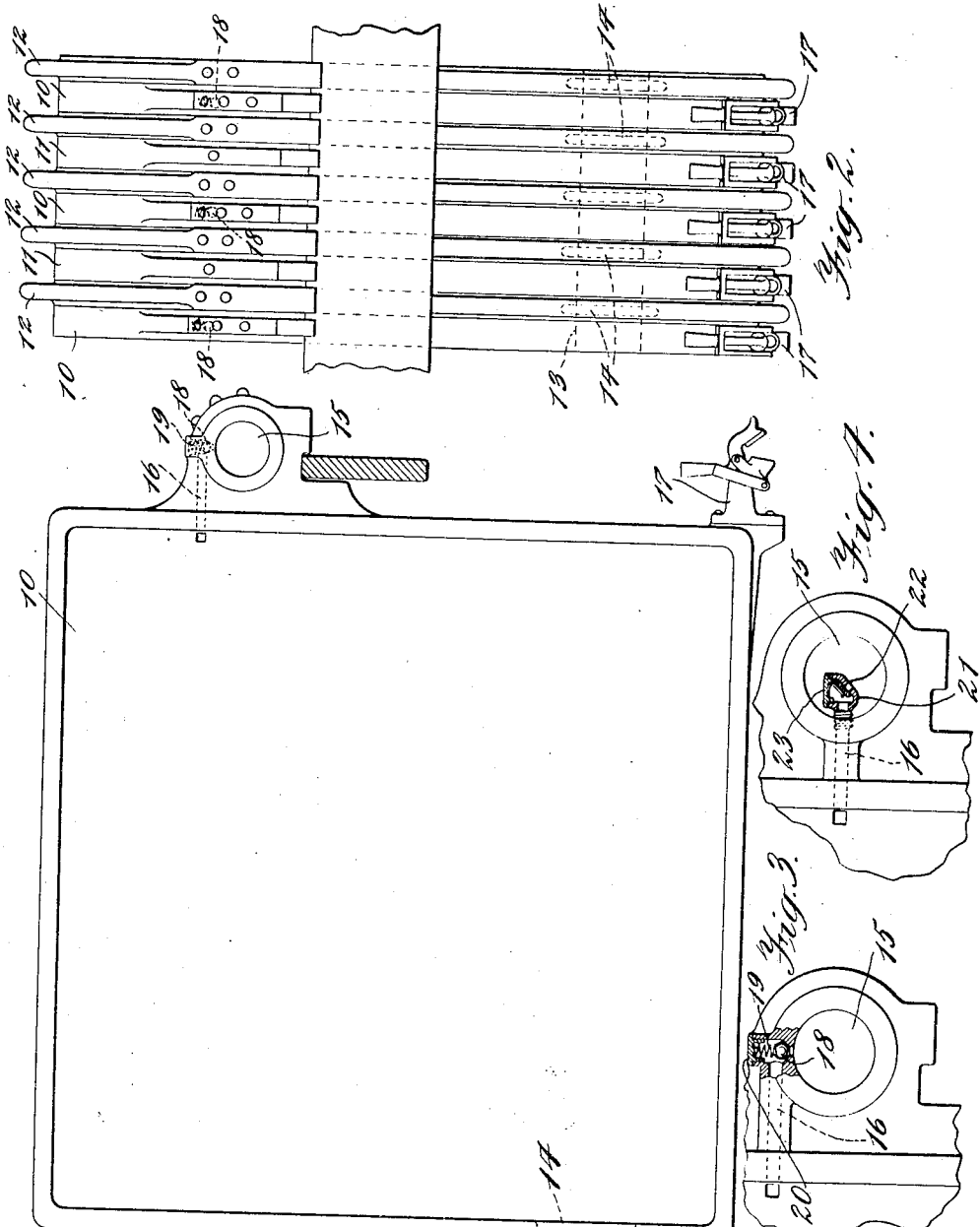
INVENTOR.
Harry T. Shriver
BY
Gifford & Bull,
ATTORNEYS

UNITED STATES PATENT OFFICE.

HARRY T. SHRIVER, OF LLEWELLYN PARK, WEST ORANGE, NEW JERSEY.

FILTER-PRESS.

1,342,829.   Specification of Letters Patent.   Patented June 8, 1920.

Application filed September 22, 1919. Serial No. 325,366.

*To all whom it may concern:*

Be it known that I, HARRY T. SHRIVER, a citizen of the United States, residing at Llewellyn Park, West Orange, in the county of Essex and State of New Jersey, have invented certain new and useful Improvements in Filter-Presses, of which the following is a specification.

My present invention relates to improvements in filter presses and particularly in plate and frame presses in which provision is made for washing the cake at the end of the filtration. One of the objects of my invention is to insure that none of the fluid being filtered shall be permitted to mix with the filtrate in the event that a filtering cloth is broken.

With these and other objects in view, my invention consists of certain novel features of construction, combination, and arrangement of parts and will be more fully described and pointed out in the appended claims.

In the drawings, Figure 1 is a sectional elevation of one form of filter press which I have adopted for purposes of illustration; Fig. 2 is a side elevation of Fig. 1 showing a view of the plates and frames as ordinarily arranged in the illustrative form of press; Fig. 3 is an enlarged view, partly in section, showing one form of my improvement as applied to a press, such as shown in Figs. 1 and 2, and Fig. 4 is a view similar to Fig. 3 showing a modification. The corresponding parts are referred to both in the drawings and in the specification by similar reference characters.

In the drawings, 10, 10, 10 represent filter plates of a usual form which, in order to designate them for purposes to be hereinafter described, are marked in some characteristic fashion as by "buttons" on the edge thereof, such plates in the illustrative form being marked with three buttons. Alternating with the plates 10 are plates 11 which are marked with one button, as shown in Fig. 2. Between each pair of plates are the press frames 12 which are marked with two buttons. It will be understood that by means of these markings the plates and frames may be reassembled at any time in the order shown in Fig. 2.

Each of the plates and frames is provided with a projection containing part of a channel 13 through which the liquid to be filtered is fed, and each frame 12 has an opening 14 connecting the interior of the frame with the feed channel 13. Similarly, each of the plates and frames is provided with a projection, each having an opening which forms part of a wash channel 15. The wash channel communicates with the three-button plates 10 through an opening 16 which communicates with the active surface of such plates. The one-button plates have no communication with the wash channel 15.

Each of the plates 10, 11 is provided with an outlet opening controlled by a cock 17 which are shown open in Fig. 1.

The construction so far described is that of a well-known type of plate and frame press. In operation such a press has the liquid to be filtered supplied to it through the channel 13, this fluid passing into each of the frames 12, from which the filtrate passes through the filter cloths held across the faces of each of the plates to find its way eventually through the cocks 17 which at this time are open, as shown in Fig. 1. After the solids have built up to a sufficient thickness on the filter cloths, the further supply of fluid through the feed channel 13 is cut off and it is then frequently desirable to wash the cake. This is done by opening the cocks on the one-button plates and closing the cocks on the three-button plates, and then passing washing fluid through the wash channel 15. This wash fluid passes through the opening 16 into the plates 10 and then through the cake held in the frames 12 to the active surfaces of one of the one-button plates 11 and from thence out of the open cock 17 on such plates.

In the event that during the filtering process a filter cloth should become broken, it has been found that the wash channel 15, as heretofore constructed, provides a means by which some of the unfiltered fluid will pass out of the filtrate delivery which is highly undesirable. For instance, if a cloth between one of the plates 10 and one of the frames 12 is broken, the unfiltered liquid will pass therethrough from the frame 11 to the plate 12 and find its way along the active surface thereof to the opening 16 and thence into the wash channel 15. From here this unfiltered fluid will pass along to others of the plates 10 through the openings 16 behind the filter cloths and so to the outlet for such plates. Thus the mixture of unfiltered liquid with the filtrate cannot be prevented even by closing the cock of the plate on which the cloth is broken, as has been done heretofore. I avoid this difficulty by placing in the opening 16 of each of the three-button plates an automatic means for controlling the flow of fluid between the wash channel 15 and the plate, such means being arranged so that the fluid may pass from the wash channel 15 to the plate, but cannot pass to the opposite direction.

As one ready means for accomplishing this purpose, I provide the arrangement shown in Fig. 3 in which the ball 18 is held on a seat formed in the plate by a spring 19, access to the spring being obtained through a screw-cap 20. With such an arrangement, it will be obvious that the washing fluid may pass only from the channel 15 to the plate.

With such an arrangement, it will be obvious that in the event of a breaking of the cloth, as explained before, no unfiltered fluid can find its way into the wash channel 15 and consequently there will be no "clouding" of the filtrate if the cock on the plate carrying the broken cloth is closed.

In Fig. 4 I have shown an alternative arrangement in which in a head 21 is a flap valve 22 held in place by a flat spring 23, this valve functioning precisely as the ball valve 18 heretofore described.

It will be obvious that my present invention can be applied to any form of filter press in which there is a wash channel communicating with successive filter plates, and I do not wish to be limited, therefore, to the specific form which I have chosen for purposes of illustration.

I claim:

1. In a plate and frame filter press, a feed channel connected to each of the frames, a wash channel connected to each alternate plate, each plate having an outlet and a cock to control the same, and automatic means to prevent the flow of fluid from the alternate plates to the wash channel while permitting the flow of fluid from the wash channel to the alternate plates.

2. In a plate and frame filter press, a feed channel connected to each of the frames, a wash channel connected to each alternate plate, each plate having an outlet and a cock to control the same, and a check valve in each opening between the wash channel and the plates, arranged to permit liquid to flow only from the wash channel to the plates.

3. A plate for a filter press having a wash channel formed therein and an opening between said channel and the active surface of the plate, and a check valve in said opening arranged to permit liquid to flow only from the wash channel to said active surface.

4. A plate for a filter press having a wash channel formed therein and an opening between said channel and the active surface of the plate, and a ball valve in said opening arranged to permit liquid to flow only from the wash channel to said active surface.

HARRY T. SHRIVER.